United States Patent
Lee

(10) Patent No.: US 7,483,107 B2
(45) Date of Patent: Jan. 27, 2009

(54) ARRAY SUBSTRATE AND DISPLAY PANEL HAVING THE SAME

(75) Inventor: Won-Kyu Lee, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 404 days.

(21) Appl. No.: 11/324,679

(22) Filed: Jan. 3, 2006

(65) Prior Publication Data

US 2006/0146260 A1    Jul. 6, 2006

(30) Foreign Application Priority Data

Jan. 3, 2005    (KR)    ...................... 10-2005-0000037

(51) Int. Cl.
   *G02F 1/1343* (2006.01)
(52) U.S. Cl. .......................... 349/143; 349/41; 349/81; 349/84; 349/151
(58) Field of Classification Search ................. 349/143, 349/58, 41, 42, 82, 81, 84, 77, 104, 106, 349/108, 144, 151
   See application file for complete search history.

(56) References Cited

U.S. PATENT DOCUMENTS

| | | | |
|---|---|---|---|
| 5,398,316 A * | 3/1995 | Guttag et al. | 604/369 |
| 6,671,010 B2 * | 12/2003 | Kwon et al. | 349/43 |
| 6,873,378 B2 * | 3/2005 | Kai | 349/38 |
| 6,906,760 B2 * | 6/2005 | Yoo et al. | 349/42 |
| 7,079,213 B2 * | 7/2006 | Lee et al. | 349/141 |
| 7,130,001 B2 * | 10/2006 | Chang et al. | 349/43 |
| 2003/0128306 A1 * | 7/2003 | Kai | 349/39 |
| 2004/0085333 A1 * | 5/2004 | Yim et al. | 345/698 |

FOREIGN PATENT DOCUMENTS

| | | | | |
|---|---|---|---|---|
| CN | 1128566 | 8/1996 | ............... | 349/96 X |
| CN | 1497298 | 5/2004 | ............... | 349/96 X |

\* cited by examiner

*Primary Examiner*—Brian M Healy
(74) *Attorney, Agent, or Firm*—F. Chau & Associates, LLC

(57) ABSTRACT

An array substrate includes storage lines, a first pixel portion, a second pixel portion, a third pixel portion and a fourth pixel portion. The storage lines divide a region into a first pixel area, a second pixel area, a third pixel area and a fourth pixel area. Two gate lines and two data lines define the region. The two gate lines are adjacent and substantially parallel to each other. The two data lines are adjacent and substantially parallel to each other. The first, second, third and fourth pixel portions are formed in the first, second, third and fourth pixel areas, respectively.

19 Claims, 12 Drawing Sheets

ARRAY SUBSTRATE AND DISPLAY PANEL HAVING THE SAME

CROSS REFERENCE TO RELATED APPLICATION

This application claims priority to Korean Patent Application No. 2005-37 filed on Jan. 3, 2005, the disclosure of which is herein incorporated by reference in its entirety.

BACKGROUND OF THE INVENTION

1. Technical Field

The present disclosure relates to an array substrate and, in particular, to an array substrate having a pixel structure that is independent of a rubbing direction and a display panel having the array substrate.

2. Discussion of the Related Art

In general, a liquid crystal display device includes a liquid crystal display panel and a driving portion for driving the liquid crystal display panel. The liquid crystal display panel includes an array substrate, a color filter substrate and a liquid crystal layer. The liquid crystal layer is positioned between the array substrate and the color filter substrate. The array substrate includes a plurality of gate lines and a plurality of data lines. The gate lines and the data lines together divide the array substrate into a plurality of pixel areas. A switching device and a pixel electrode are formed in each of the pixel areas. The switching device is connected to the pixel electrode.

Liquid crystal molecules in the liquid crystal layer may be irregularly arranged in the presence of an electric field applied to the liquid crystal layer. The irregular arrangement may be due to a coupling phenomenon between the data line and the pixel electrode and a rubbing direction of the liquid crystal layer, which affect arrangements of the liquid crystal molecules. The above-mentioned phenomenon is referred to as a disclination. When the disclination is generated in the liquid crystal layer, light leaks along the data line.

To suppress light leakage, a gate metal layer included in the array substrate is formed by using a mask. The mask has a size in accordance with a size of a common electrode pattern of a storage capacitor adjacent to the data line. In addition, a color filter is formed by using a mask having a size in accordance with a size of a light-blocking pattern corresponding to the data line.

Masks used for forming the array substrate or the color filter substrate must be varied in accordance with the rubbing direction of the liquid crystal layer.

SUMMARY OF THE INVENTION

Exemplary embodiments of the present invention provide an array substrate having a pixel structure that is independent of a rubbing direction, and a display panel having the array substrate.

In accordance with an embodiment of the present invention, an array substrate includes storage lines, a first pixel portion, a second pixel portion, a third pixel portion and a fourth pixel portion. The storage lines divide a region into a first pixel area, a second pixel area, a third pixel area and a fourth pixel area. Two gate lines and two data lines define the region. The two gate lines are adjacent and substantially parallel to each other. The two data lines are adjacent and substantially parallel to each other. The first, second, third and fourth pixel portions are formed in the first, second, third and fourth pixel areas, respectively.

In accordance with an exemplary embodiment of the present invention, each of the first through fourth pixel portions includes a switching device and a pixel electrode. The switching device includes a control electrode, a first current electrode and a second current electrode. The control electrode is connected to a gate line. The first current electrode is connected to a data line. The second current electrode of the switching device is connected to the pixel electrode In accordance with an exemplary embodiment of the present invention, each of the first to fourth pixel portions includes a storage capacitor. The storage capacitor corresponds to a region where the pixel electrode and a storage line are overlapped.

In accordance with an exemplary embodiment of the present invention, the storage line includes a storage pattern. The storage pattern is adjacent and substantially parallel to the data line connected to the switching device.

In accordance with an exemplary embodiment of the present invention, the first to fourth pixel portions together define a quadrangular region. The switching devices are formed at angular portions of the quadrangular region.

In accordance with an exemplary embodiment of the present invention, the array substrate includes a first reflection plate, a second reflection plate, a third reflection plate and a fourth reflection plate. The first reflection plate, the second reflection plate, the third reflection plate and the fourth reflection plate are formed in the first pixel area, the second pixel area, the second pixel area and the fourth area, respectively.

In accordance with an exemplary embodiment of the present invention, each of the first to fourth reflection plates has a window therethrough.

In accordance with an exemplary embodiment of the present invention, the first to fourth pixel portions together define a quadrangular region, and the windows are formed through a central portion of the quadrangular region.

In accordance with another embodiment of the present invention, a display panel includes an array substrate, a liquid crystal layer and an opposite substrate. The array substrate includes storage lines, a first pixel portion, a second pixel portion, a third pixel portion and a fourth pixel portion. The storage lines divide a region into a first pixel area, a second pixel area, a third pixel area and a fourth pixel area. Two gate lines and two data lines define the region. The two gate lines are adjacent and substantially parallel to each other. The two data lines are adjacent and substantially parallel to each other. The first, second, third and fourth pixel portions are formed in the first, second, third and fourth pixel areas, respectively. The opposite substrate is combined with the array substrate to receive the liquid crystal layer between the opposite substrate and the array substrate.

In accordance with an exemplary embodiment of the present invention, the opposite substrate includes a light-blocking pattern corresponding to the data lines and the gate lines.

In accordance with an exemplary embodiment of the present invention, each of the first to fourth pixel portions includes a switching device and a pixel electrode. The switching device includes a control electrode, a first current electrode and a second current electrode. The control electrode is connected to a gate line. The first current electrode is connected to a data line. The second current electrode of the switching device is connected to the pixel electrode.

In accordance with an exemplary embodiment of the present invention, the first to fourth pixel portions together define a quadrangular region. The switching devices are formed at angular portions of the quadrangular region.

In accordance with an exemplary embodiment of the present invention, the light-blocking pattern corresponds to the switching devices.

In accordance with an exemplary embodiment of the present invention, a storage line includes a storage pattern. The storage pattern is adjacent and substantially parallel to the data line connected to the switching device.

In accordance with an exemplary embodiment of the present invention, the light-blocking pattern has a portion corresponding to the data line. The portion has a first width. The data line has a second width. The storage line has a third width. The first width is substantially larger than the second width. The first width is no more than a sum of the second width and the third width.

In accordance with an exemplary embodiment of the present invention, the display panel includes a first reflection plate, a second reflection plate, a third reflection plate and a fourth reflection plate. The first reflection plate, the second reflection plate, the third reflection plate and the fourth reflection plate are formed in the first pixel area, the second pixel area, the second pixel area and the fourth area, respectively.

In accordance with an exemplary embodiment of the present invention, each of the first to fourth reflection plates has a window therethrough.

In accordance with an exemplary embodiment of the present invention, the first to fourth pixel portions together define a quadrangular region, and the windows are formed through a central portion of the quadrangular region.

According to embodiments of the present invention, an array substrate and a color filter substrate may be efficiently formed by using a mask that is independent of a rubbing direction.

BRIEF DESCRIPTION OF THE DRAWINGS

Preferred embodiments of the present invention can be understood in more detail from the following descriptions taken in conjunction with the accompanying drawings in which.

DETAILED DESCRIPTION OF THE PREFERRED EMBODIMENTS

Preferred embodiments of the present invention will now be described more fully hereinafter in more detail with reference to the accompanying drawings, in which preferred embodiments of the invention are shown. This invention may, however, be embodied in many different forms and should not be construed as limited to the embodiments set forth herein.

Figure 1:
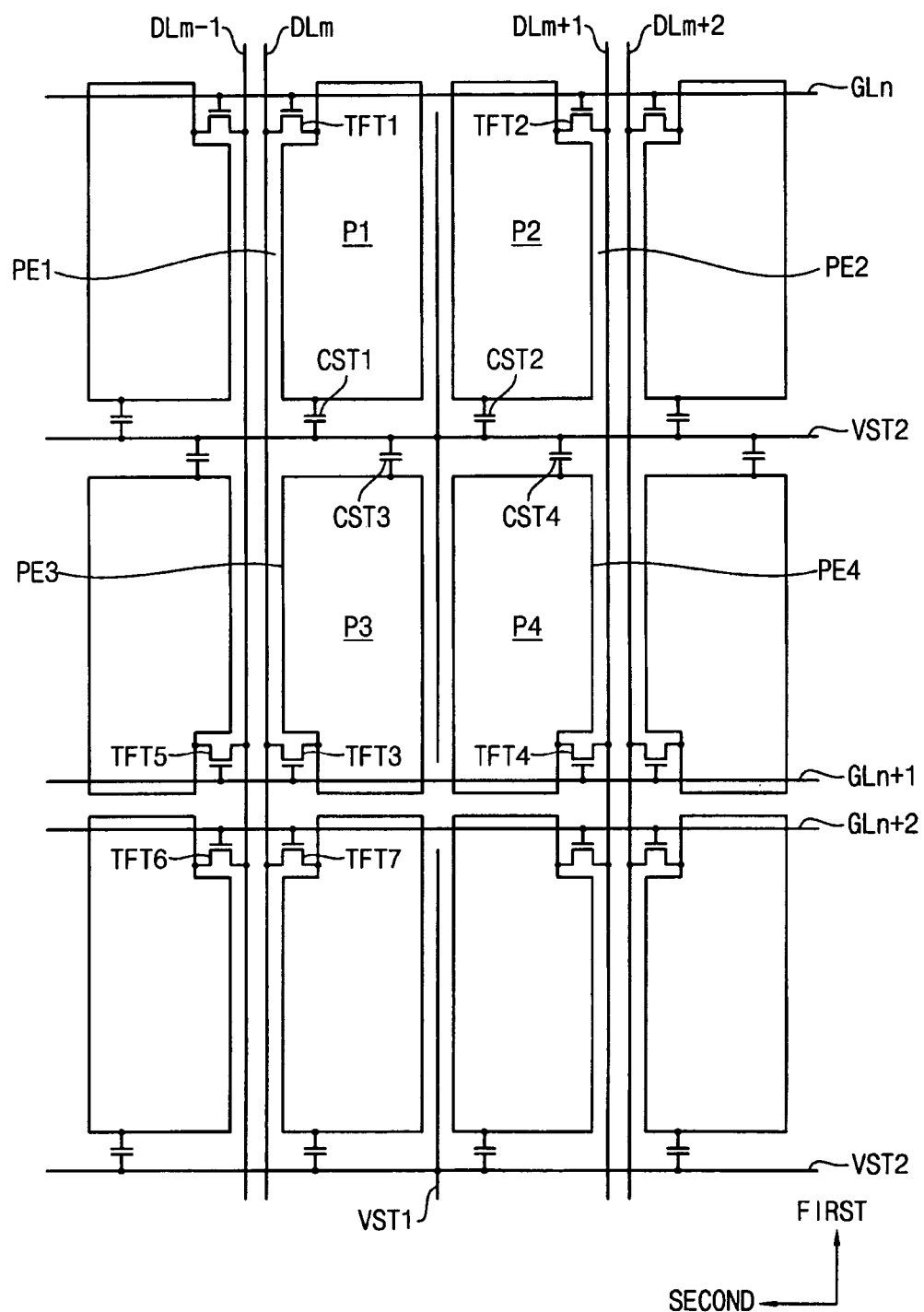
FIG. 1 is a plan view illustrating an array substrate in accordance with an exemplary embodiment of the present invention.

FIG. 1 is a plan view illustrating an array substrate in accordance with an exemplary embodiment of the present invention.

Referring to FIG. 1, an array substrate includes N gate lines GL and M data lines DL. Here, "N" is the number of the gate lines GL. "M" is the number of the data DL lines. The N gate lines GL extend in a second direction. The N gate lines are substantially parallel with each other. The M data lines DL extend in a first direction that is substantially perpendicular to the second direction. The M gate lines are substantially parallel with each other.

The N gate lines GL and the M data lines DL together define M×N pixel areas. Here, "M×N" is the number of the pixel areas.

Two gate lines that are adjacent to each other and two data lines that are adjacent to each other may define four pixel areas.

In detail, an n-th gate line GLn, an (n+1)-th gate line GLn+1, an m-th data line DLm and an (m+1)-th data line DLm together define a first pixel area, a second pixel area, a third pixel area and a fourth pixel area.

A first pixel portion P1, a second pixel portion P2, a third pixel portion P3 and a fourth pixel portion P4 are formed in the first pixel area, the second pixel area, the third pixel area and the fourth pixel area, respectively.

The first pixel portion P1 includes a first switching device TFT1 and a first pixel electrode PE1. The first switching device TFT1 is connected to the n-th gate line GLn and the m-th data line DLm. The first pixel electrode PE1 is connected to the first switching device TFT1.

The second pixel portion P2 includes a second switching device TFT2 and a second pixel electrode PE2. The second switching device TFT2 is connected to the n-th gate line GLn and the (m+1)-th data line DLm+1. The second pixel electrode PE2 is connected to the second switching device TFT2.

The first pixel portion P1 includes a first storage capacitor CST1. The second pixel portion P2 includes a second storage capacitor CST2.

A first storage line VST1 extends between the first pixel portion P1 and the second pixel portion P2 in the first direction so that the first pixel portion P1 may be separated from the second pixel portion P2.

The third pixel portion P3 includes a third switching device TFT3 and a third pixel electrode PE3. The third switching device TFT3 is connected to the (n+1)-th gate line GLn+1 and the m-th data line DLm. The third pixel electrode PE3 is connected to the third switching device TFT3.

The fourth pixel portion P4 includes a fourth switching device TFT4 and a fourth pixel electrode PE4. The fourth switching device TFT4 is connected to the (n+1)-th gate line GLn+1 and the (m+1)-th data line DLm+1. The fourth pixel electrode PE4 is connected to the fourth switching device TFT4.

The third pixel portion P3 includes a third storage capacitor CST3. The fourth pixel portion P4 includes a fourth storage capacitor CST4.

The first storage line VST1 extends between the third pixel portion P3 and the fourth pixel portion P4 in the first direction so that the third pixel portion P3 may be separated from the fourth pixel portion P4.

A second storage line VST2 extends between the first pixel portion P1 and the third pixel portion P3 in the second direction so that the first pixel potion P1 may be separated from the third pixel portion P3. In addition, the second storage line VST2 extends between the second pixel portion P2 and the fourth pixel portion P4 in the second direction so that second pixel portion P2 may be separated from the fourth pixel portion P4.

A fifth switching device TFT5, a sixth switching device TFT6 and a seventh switching device TFT7 are adjacent to the third switching device TFT3. The fifth switching device TFT5 is connected to an (m−1)-th data line DLm−1 and the (n+1)-th gate line GLn+1. The sixth switching device TFT6 is connected to the (m−1)-th data line DLm−1 and an (n+2)-th gate line GLn+2. The seventh switching device TFT7 is connected to the m-th data line DLm and the (n+2)-th gate line GLn+2.

Figure 2:
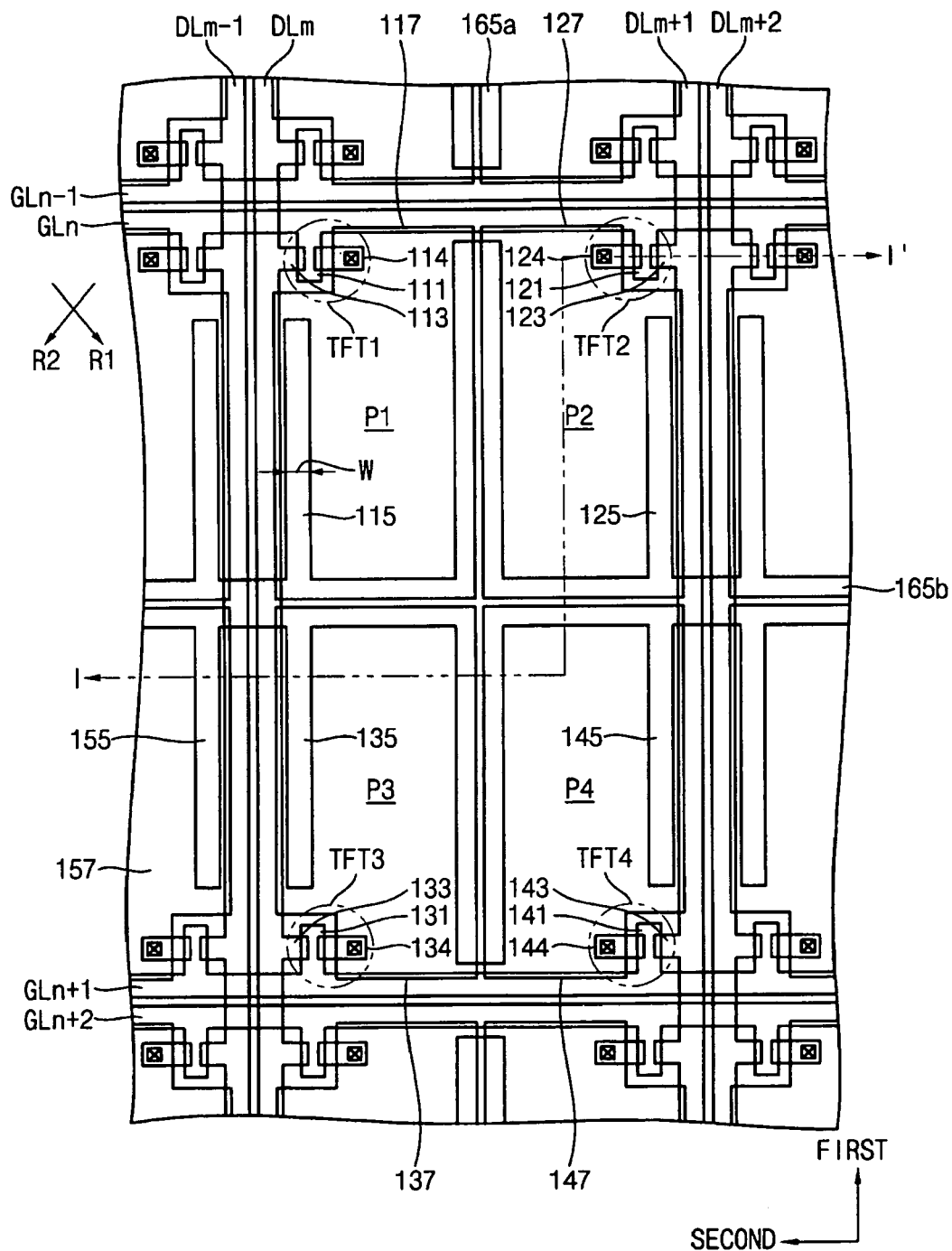
FIG. 2 is a partially enlarged view illustrating the array substrate in FIG. 1.

FIG. 2 is a partially enlarged view illustrating the array substrate in FIG. 1.

The m-th data line DLm, the (m+1)-th data line DLm+1, the n-th gate line GLn, the (n+1)-th gate line GLn+1, a first storage line 165a and a second storage line 165b together define the first pixel area, the second pixel area, the third pixel area and the fourth pixel area. The first pixel portion P1, the second pixel portion P2, the third pixel portion P3 and the fourth pixel portion P4 are formed in the first pixel area, the second pixel area, the third pixel area and the fourth pixel area, respectively.

The first pixel portion P1 includes the first switching device TFT1, the first pixel electrode 117 and the first storage capacitor CST1. The first switching device TFT1 includes a first gate electrode 111, a first source electrode 113 and a first drain electrode 114. The first gate electrode 111 is connected to the n-th gate line GLn. The first source electrode 113 is connected to the m-th data line DLm. The first drain electrode 114 is connected to the first pixel electrode 117.

The first storage capacitor CST1 includes a first lower electrode and a first upper electrode. The first storage line 165a, the second storage line 165b and a first storage pattern 115 are used as the first lower electrode. The first pixel electrode 117 is used as the first upper electrode. The first storage pattern 115 is adjacent to the m-th data line DLm. In addition, the first storage pattern 115 is substantially parallel to the m-th data line DLm.

A width W of the first storage pattern 115 is at least a sum of a first width W1 and a second width W2. The first width W1 is determined based on a misalignment between the array substrate and a substrate opposite to the array substrate. The second width W2 is determined based on light leakage due to a disclination in a liquid crystal layer. A rubbing direction and an electrical field may affect the disclination in the liquid crystal layer. An electric potential difference between the m-th data line DLm and the first pixel electrode 117 may generate the electrical field.

The second pixel portion P2 includes the second switching device TFT2, the second pixel electrode 127 and the second storage capacitor CST2. The second switching device TFT2 includes a second gate electrode 121, a second source electrode 123 and a second drain electrode 124. The second gate electrode 121 is connected to the n-th gate line GLn. The second source electrode 123 is connected to the (m+1)-th data line DLm+1. The second drain electrode 124 is connected to the second pixel electrode 127.

The second storage capacitor CTS2 includes a second lower electrode and a second upper electrode. The first storage line 165a, the second storage line 165b and a second storage pattern 125 are used as the second lower electrode. The second pixel electrode 127 is used as the second upper electrode. The second storage pattern 125 is adjacent to the (m+1)-th data line DLm+1. In addition, the second storage pattern 125 is substantially parallel to the (m+1)-th data line DLm+1.

A width of the second storage pattern 125 is substantially identical to that of the first storage pattern 115. Thus, any further explanation thereof will be omitted.

The third pixel portion P3 includes the third switching device TFT3, the third pixel electrode 137 and the third storage capacitor CST3. The third switching device TFT3 includes a third gate electrode 131, a third source electrode 133 and a third drain electrode 134. The third gate electrode 131 is connected to the (n+1)-th gate line GLn+1. The third source electrode 133 is connected to the m-th data line DLm. The third drain electrode 134 is connected to the third pixel electrode 137.

The third storage capacitor CST3 includes a third lower electrode and a third upper electrode. The first storage line 165a, the second storage line 165b and a third storage pattern 135 are used as the third lower electrode. The third pixel electrode 137 is used as the third upper electrode. The third storage pattern 135 is adjacent to the m-th data line DLm. In addition, the third storage pattern 135 is substantially parallel to the m-th data line DLm.

A width of the third storage pattern 135 is substantially identical to that of the first storage pattern 115. Thus, any further explanation thereof will be omitted.

The fourth pixel portion P4 includes a fourth switching device TFT4, a fourth pixel electrode 147 and a fourth storage capacitor CST4. The fourth switching device TFT4 includes a fourth gate electrode 141, a fourth source electrode 143 and a fourth drain electrode 144. The fourth gate electrode 141 is connected to the (n+1)-th gate line GLn+1. The source gate electrode 143 is connected to the (m+1)-th data line DLm+1. The fourth drain electrode 144 is connected to the fourth pixel electrode 147.

The fourth storage capacitor CST4 includes a fourth lower electrode and a fourth upper electrode. The first storage line 165a, the second storage line 165b and a fourth storage pattern 145 are used as the fourth lower electrode. The fourth pixel electrode 147 is used as the fourth upper electrode. The fourth storage pattern 145 is adjacent to the (m+1)-th data line DLm+1. In addition, the fourth storage pattern 145 is substantially parallel to the (m+1)-th data line DLm+1.

A width of the fourth storage pattern 145 is substantially identical to that of the first storage pattern 115. Thus, any further explanation thereof will be omitted.

Figure 3:
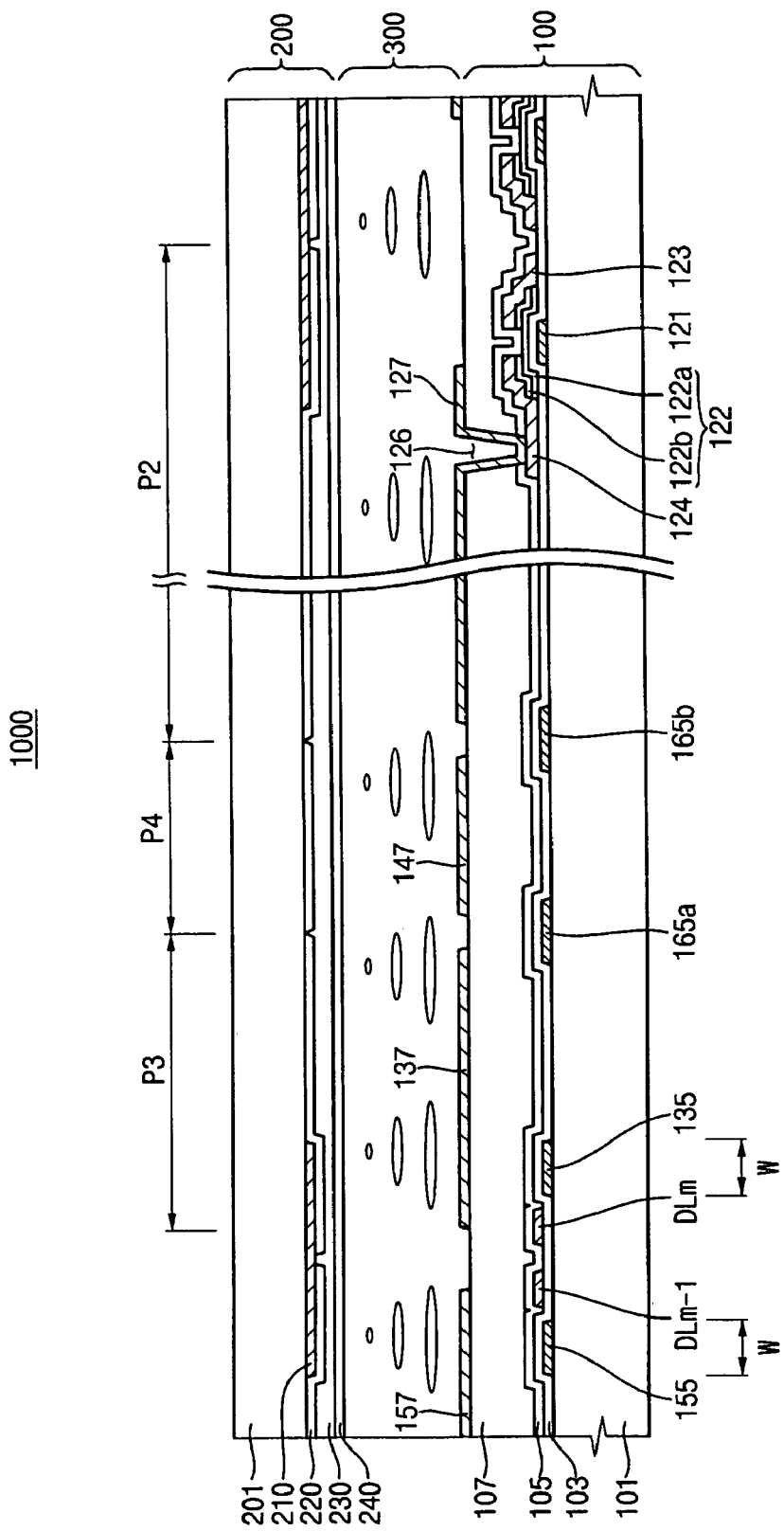
FIG. 3 is a cross-sectional view of a display panel including a cross-sectional view of the array substrate taken along the line I-I' in FIG. 2 in accordance with an exemplary embodiment of the present invention.

FIG. 3 is a cross-sectional view of a display panel including a cross-sectional view of the array substrate taken along a line I-I' in FIG. 2.

Referring to FIGS. 2 and 3, a display panel 1000 includes the array substrate 100, a color filter substrate 200 and the liquid crystal layer 300. The liquid crystal layer 300 is positioned between the array substrate 100 and the color filter substrate 200.

The array substrate 100 includes a first base substrate 101. A gate metal layer is formed on the first base substrate 101. The gate metal layer is then patterned to form gate metal patterns including storage patterns, gate electrodes and storage lines. A gate insulation layer 103 is formed on the gate metal patterns.

The width W of the first storage pattern 115 is at least the sum of the first width W1 and the second width W2. The first width W1 is determined based on the misalignment between the array substrate 100 and the color filter substrate 200. The second width W2 is determined based on the light leakage due to the disclination in the liquid crystal layer 300.

The first storage pattern 115 is horizontally apart from the m-th data line DLm. In addition, the third storage pattern 135 of the third pixel portion P3 is horizontally apart from the m-th data line DLm. Thus, the light leakage due to the disclination in the liquid crystal layer 300 may be efficiently suppressed.

The first storage line 165a extends between the first pixel area and the second pixel area. Thus, the first pixel area is separated from the second pixel area. In addition, the first storage line 165a extends between the third pixel area and the fourth pixel area. Thus, the third pixel area is separated from the fourth pixel area.

There is no data line between the first pixel area and the second pixel area so that the disclination is hardly generated between the first pixel area and the second pixel area. Accordingly, a width of the first storage line 165a is at least a sum of the width of the first storage pattern 115 and the width of the second storage pattern 125. As a result, the first pixel portion P1 and the second pixel portion P2 may be relatively wide. The third pixel portion P3 and the fourth pixel portion P4 are substantially identical to the first pixel portion P1 and the second pixel portion P2, respectively. Thus, any further explanation thereof will be omitted.

The second storage line 165b extends between the first pixel area and the third pixel area in the second direction. Thus, the first pixel area is separated from the third pixel area. In addition, the second storage line 165b extends between the second pixel area and the fourth pixel area in the second direction. Thus, the second pixel area is separated from the fourth pixel area.

The second switching device TFT2 includes the second gate electrode 121 and a semiconductor layer 122. The second gate electrode 121 is formed on the first base substrate 101. The semiconductor layer 122 is formed on the second gate electrode 121. The semiconductor layer 122 includes an active layer 122a and a contact layer 122b. The active layer 122a is formed on the second gate electrode 121. The contact layer 122b is formed on the active layer 122a.

The second source electrode 123 and the second drain electrode 124 are formed on the semiconductor layer 122. A passivation layer 105 is formed on the second source electrode 123 and the second drain electrode 124. Alternatively, the passivation layer 105 and an organic layer 107 are formed on the source electrode 123 and the drain electrode 124. A second pixel electrode 127 is formed on the organic layer 107. The second pixel electrode 127 is electrically connected to the second drain electrode 124 through a contact hole 126.

The color filter substrate 200 includes a second base substrate 201, a light-blocking pattern 210, a color filter layer 220, a protection layer 230 and a transparent conductive layer 240. The light-blocking pattern 210 is formed on the second base substrate 201. The transparent conductive layer 240 is substantially opposite to the pixel electrodes.

The light-blocking pattern 210 may prevent current leakage through the array substrate 100. The light-blocking pattern 210 corresponds to the data lines and the gate lines of the array substrate 100.

In detail, the light-blocking pattern 210 corresponds to the (m−1)-th data line DLm−1 and the m-th data line DLm that are adjacent to each other. In addition, the light-blocking pattern 210 corresponds to the (n−1)-th gate lines GLn−1 and the n-th gate line GLn that are adjacent to each other. Furthermore, the light-blocking pattern 210 corresponds to the switching devices connected to the (m−1)-th data line DLm−1 and the m-th data line DLm. The switching devices may be connected to the (n−1)-th gate lines GLn−1 and the n-th gate line GLn.

The light-blocking pattern 210 is not formed over the first storage line 165a and the second storage line 165b because the first storage line 165a and the second storage line 165b operate to prevent light leakage.

The color filter layer 220 corresponds to the pixel areas. The color filter layer 220 includes at least one red color filter pattern, at least one green color filter pattern and at least one blue color filter pattern.

The protection layer 230 protects the color filter layer 220. In addition, the protection layer 230 may compensate for a difference in height between the light-blocking pattern 210 and the color filter layer 220.

The transparent conductive layer 240 is formed on the protection layer 230. The pixel electrodes formed on the array substrate 100 and the liquid crystal layer 300 may define a liquid crystal capacitor.

Figure 4A:
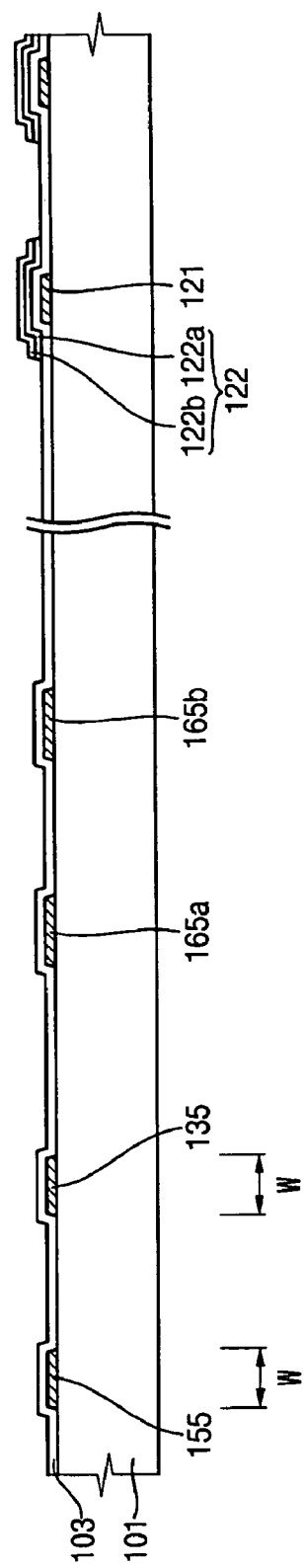
FIGS. 4A, 5A and 6A are plan views illustrating a method for forming the array substrate of the display panel in FIG. 3 in accordance with an exemplary embodiment of the present invention.
Figure 4B:
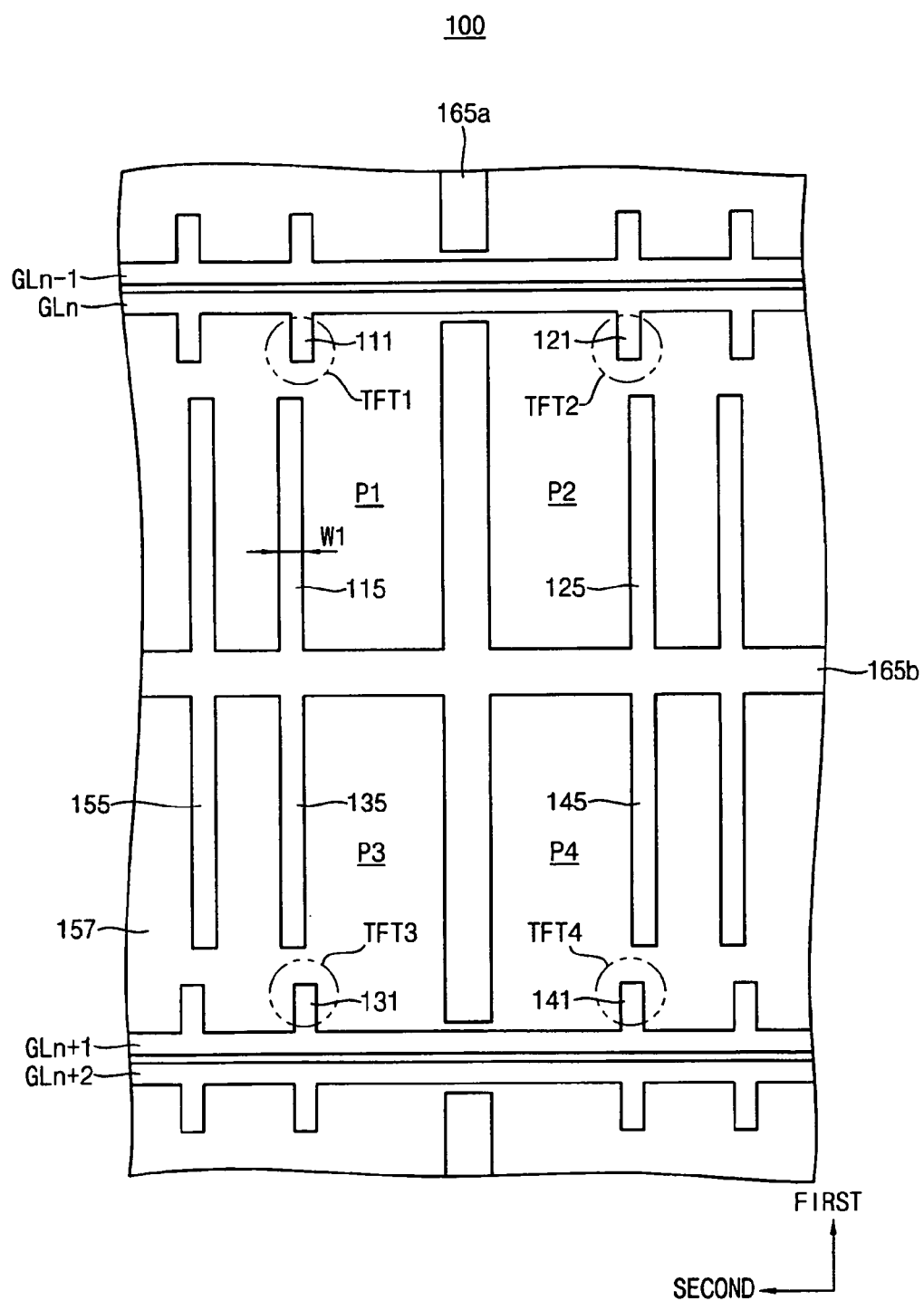
FIGS. 4B, 5B and 6B are cross-sectional views illustrating the method for forming the array substrate of the display panel in FIG. 3 in accordance with an exemplary embodiment of the present invention.
Figure 5A:
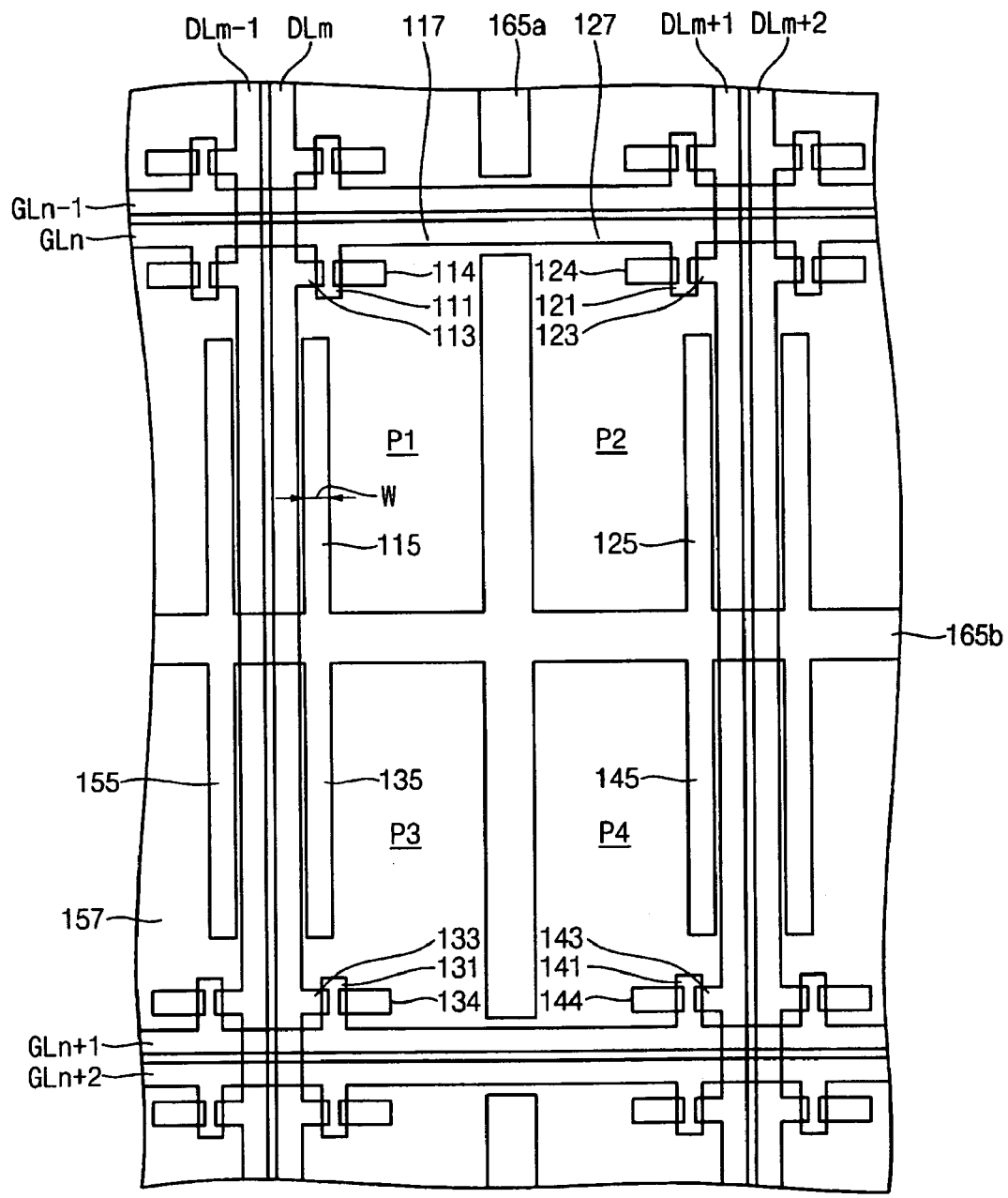
Figure 5B:
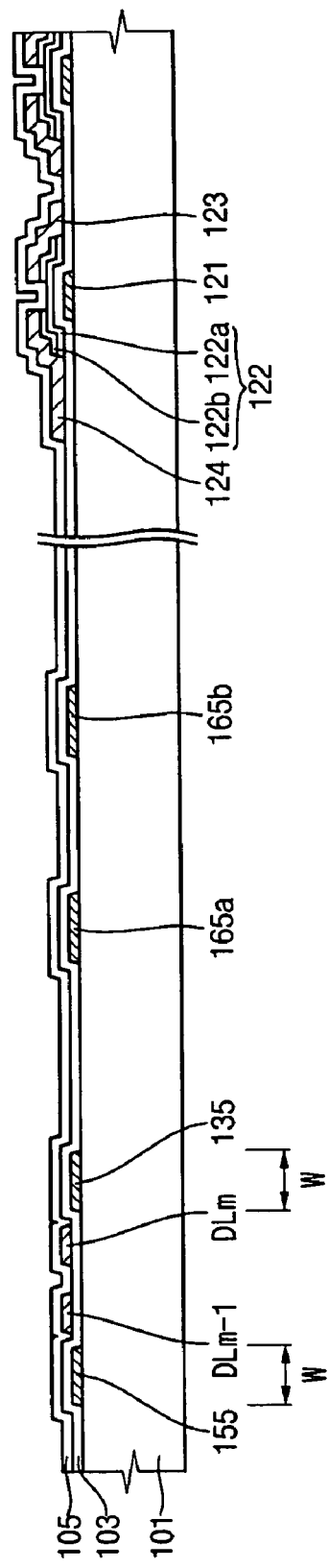
Figure 6A:
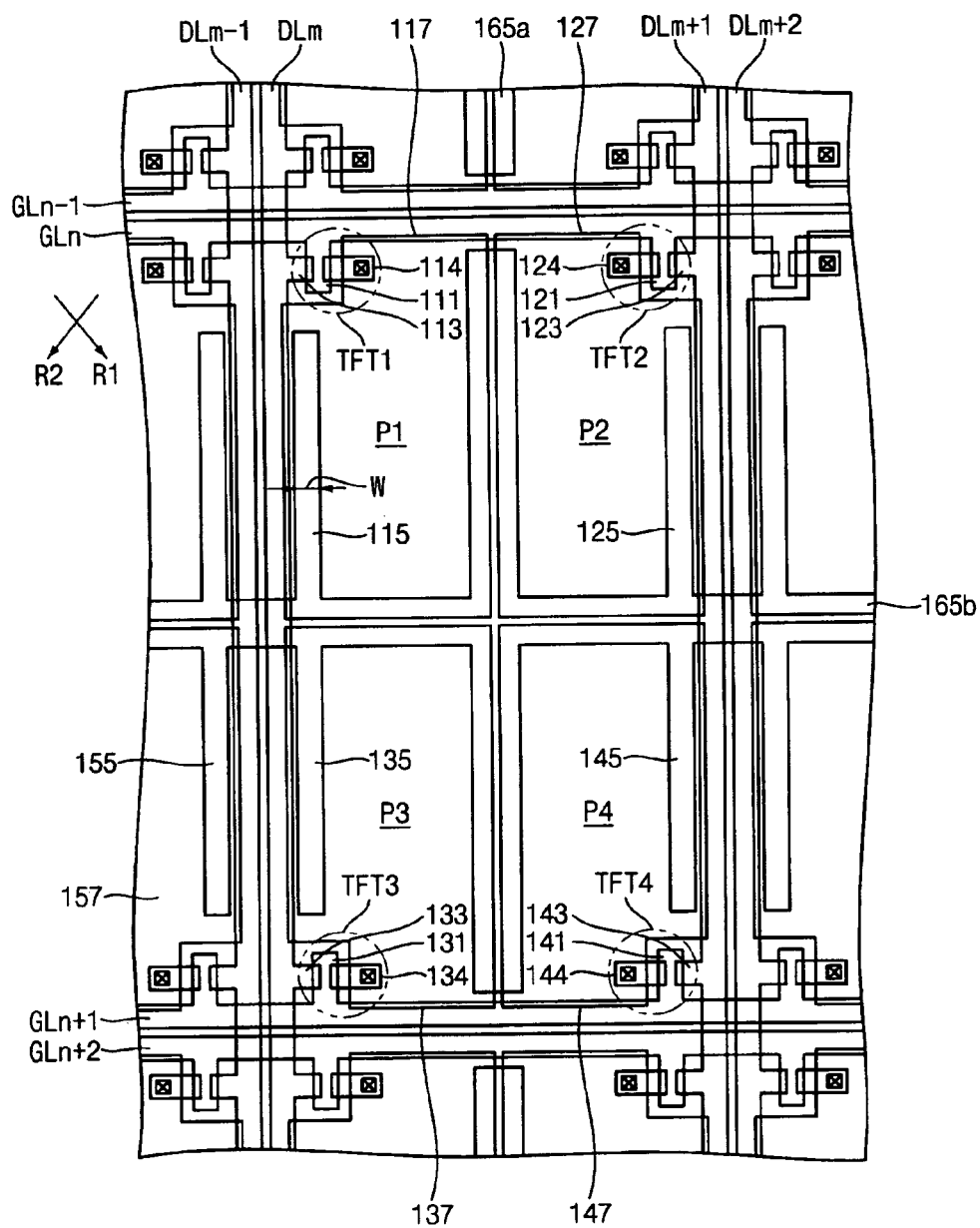
Figure 6B:
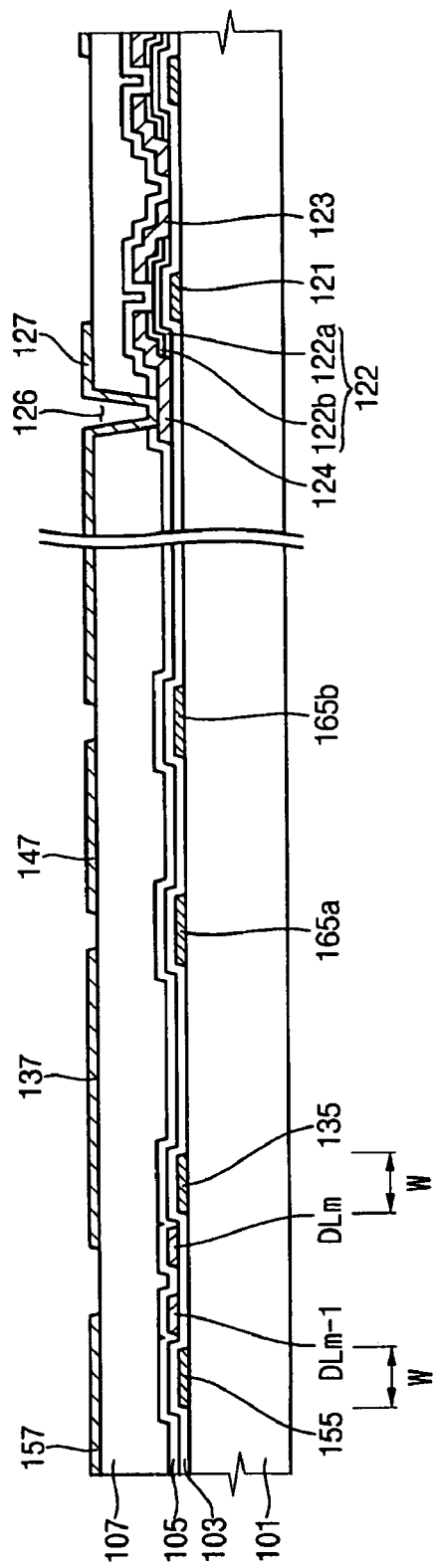

FIGS. 4A, 5A and 6A are plan views illustrating a method for forming the array substrate of the display panel in FIG. 3. FIGS. 4B, 5B and 6B are cross-sectional views illustrating the method for forming the array substrate of the display panel in FIG. 3.

Referring to FIGS. 4A and 4B, a gate metal layer (not shown) is formed on a first base substrate 101 of an array substrate 100. The gate metal layer is then patterned to form gate metal patterns.

The gate metal patterns include gate lines GL, first, second, third, fourth and fifth storage patterns 115, 125, 135, 145 and 155, a first storage line 165a, a second storage line 165b and first, second, third and fourth gate electrodes 111, 121, 131 and 141

The gate lines GL extend in a second direction. The gate lines GL are substantially parallel with each other. First, second, third, fourth and fifth storage capacitors CST1, CST2, CST3, CST4 and CST5 include the first, second, third, fourth and fifth storage patterns 115, 125, 135, 145 and 155, respectively. The first storage line 165a and the second storage line 165b may separate adjacent pixel areas from each other.

The first, second, third and fourth switching devices TFT1, TFT2, TFT3 and TFT4 include the first, second, third and fourth gate electrodes 111, 121, 131 and 141, respectively.

A width W of the first storage pattern 115 is at least a sum of a first width W1 and a second width W2. The first width W1 is determined based on a misalignment between the array substrate 100 and a color filter substrate opposite to the array substrate. The second width W2 is determined based on a light leakage due to a disclination in a liquid crystal layer.

Widths of the second, third, fourth and fifth storage patterns 125, 135, 145 and 155 are substantially identical to that of the first storage pattern 115. Thus, any further explanation thereof will be omitted.

Light leakage due to the disclination in the liquid crystal layer having first and second rubbing directions may be suppressed. As a result, there is no need to vary a mask for patterning the gate metal layer in accordance with the rubbing directions.

First, second, third and fourth pixel portions P1, P2, P3 and P4 are formed in the first, second, third and fourth pixel areas, respectively. The first storage line 165a extends between the first pixel portion P1 and the second pixel portion P2 in the first direction so that the first pixel portion P1 may be separated from the second pixel portion P2. In addition, the first storage line 165a extends between the third pixel portion P3 and the fourth pixel portion P4 so that the third pixel portion P3 may be separated from the fourth pixel portion P4.

The second storage line 165b extends between the first pixel portion P1 and the third pixel portion P3 in the second direction so that the first pixel portion P1 may be separated from the third pixel portion P3. In addition, the second storage line 165b extends between the second pixel portion P2 and the fourth pixel portion P4 so that the second pixel portion P2 may be separated from the fourth pixel portion P4.

A gate insulation layer 103 is formed on the gate metal patterns.

Referring to FIGS. 5A and 5B, a semiconductor layer 122 is formed on the gate insulation layer 103. The semiconductor layer includes an active layer 122a and a resistive contact layer 122b.

A preliminary semiconductor layer (not shown) including a preliminary active layer and a preliminary resistive contact layer is etched to form the semiconductor layer 122 including the active layer 122a and the resistive contact layer 122b. The semiconductor layer 122 covers the first, second, third and fourth gate electrodes 111, 121, 131 and 141.

A data metal layer (not shown) is formed on the first base substrate 101 on which the semiconductor layer 122 is formed. The data metal layer is then patterned to form data metal patterns including the data lines DL, first, second, third and fourth source electrodes 113, 123, 133 and 143 of the switching devices TFT and first, second, third and fourth drain electrodes 114, 124, 134 and 144 of the switching devices TFT.

As illustrated in FIG. 5A, there is no pixel area between a $(m^{-1})$-th data line DLm−1 and an m-th data line DLm. Two pixel electrodes along the second direction (e.g. first and second pixel portions P1 and P2) are formed between the m-th data line DLm and the (m+1)-th data line. The two pixel electrodes are separated from each other by the first storage line 165a. For example, there is no data line between the first pixel portion P1 and the second pixel portion P2.

The resistive contact layer 122b is etched by using the second source electrode 123 and the second drain electrode 124 together as a mask to form a channel of the second switching device TFT2.

A passivation layer 105 is formed on the first base substrate 101 on which the data metal patterns are formed. Alternatively, the passivation layer 105 and an organic layer 107 are formed on the first base substrate 101 on which the data metal patterns are formed. The organic layer 107 may be relatively thick.

Referring to FIGS. 6A and 6B, a transparent conductive layer (not shown) is formed on the passivation layer 107. The transparent conductive layer is then patterned to form pixel electrodes.

The pixel electrodes correspond to the pixel areas defined by the gate lines GL, the data lines DL, the first storage line 165a and the second storage line 165b. As illustrated in FIG. 6A, first, second, third and fourth pixel electrodes 117, 127, 137 and 147 are formed in the first, second, third and fourth pixel areas, respectively.

Referring to FIG. 6A, the fifth pixel electrode 157 is partially overlapped with the (m−1)-th data line DLm−1. In addition, the third pixel electrode 137 is partially overlapped with the m-th data line DLm.

In case that the organic layer 107 is not formed, the third pixel electrode 137 and the m-th data line DLm are spaced apart from each other by a constant interval that may be determined with consideration of a parasite capacitor between the third pixel electrode 137 and the m-th data line DLm. In addition, the fifth electrode 157 and the (m−1)-th data line DLm−1 may be spaced apart from each other by a constant interval.

Figure 7A:
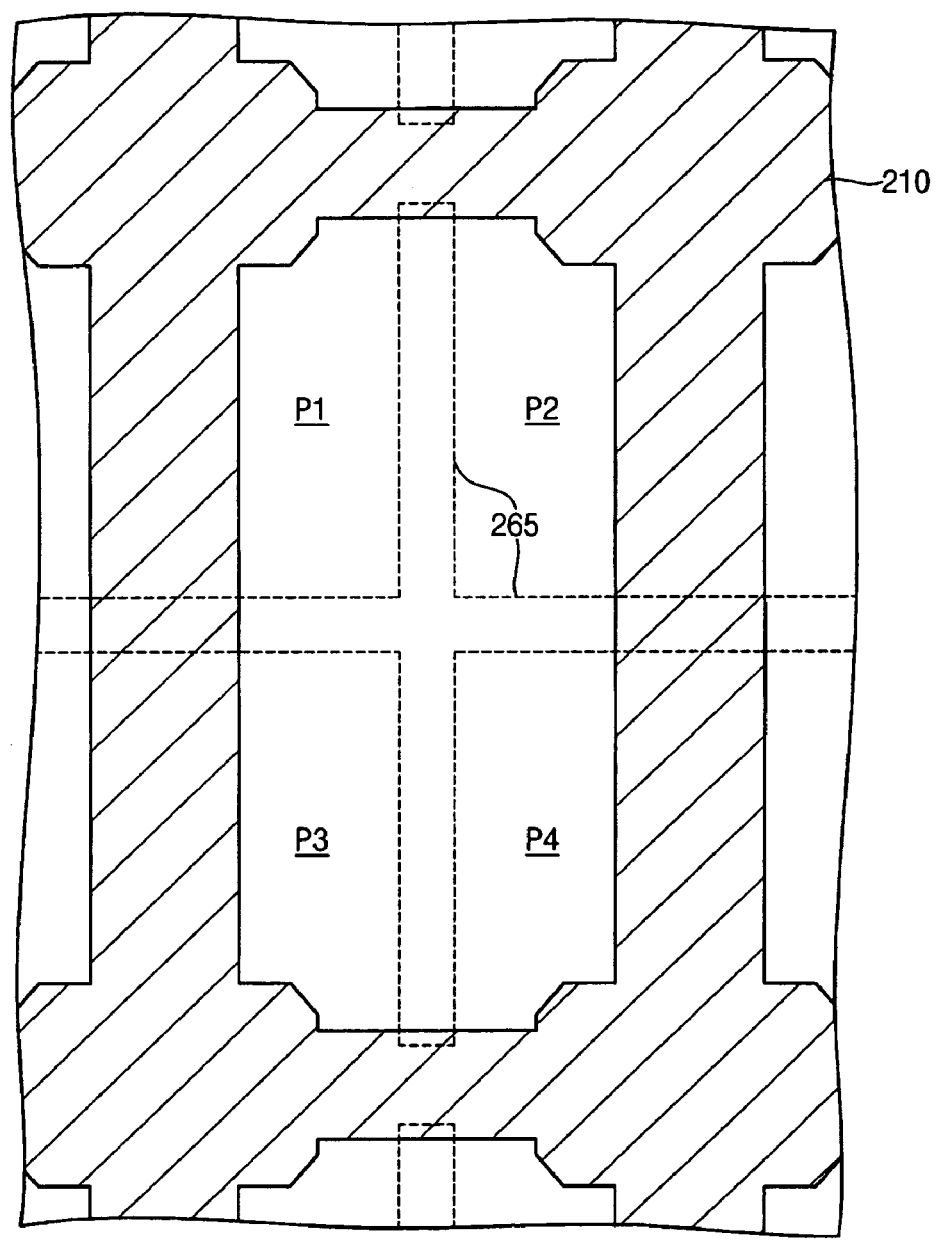
FIG. 7A is a plan view illustrating a color filter substrate of the display device in FIG. 3 in accordance with an exemplary embodiment of the present invention.
Figure 7B:
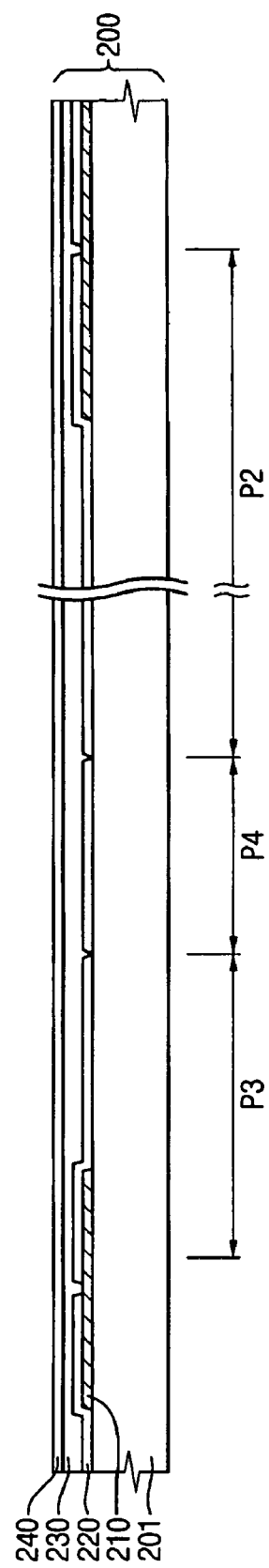
FIG. 7B is a cross-sectional view illustrating the color filter substrate of the display device in FIG. 3 in accordance with an exemplary embodiment of the present invention.

FIG. 7A is a plan view illustrating the color filter substrate of the display device in FIG. 3. FIG. 7B is a cross-sectional view illustrating the color filter substrate of the display device in FIG. 3.

Referring to FIGS. 7A and 7B, a light-blocking pattern 210 is formed on a second base substrate 201 of a color filter substrate 200.

The light-blocking pattern 210 corresponds to the gate lines GL and the data lines DL of the array substrate 100. A plurality of openings is formed through light-blocking pattern 210. The openings correspond to the first, second, third and fourth pixel portions P1, P2, P3 and P4.

The light-blocking pattern is not formed over the first and second storage lines 165a and 165b because the first and second storage lines 165a and 165b suppress a light leakage. Alternatively, the light-blocking pattern 210 may be formed on the first and second storage lines 165a and 165b.

A color filter layer 220 is formed on the second base substrate 201 on which the light-blocking pattern 210 is formed. The color filter layer 220 includes at least one red color filter pattern, at least one green color filter pattern and at least one blue color filter pattern. The red color filter pattern, the green color filter pattern and the blue color filter pattern correspond to the first, second, third and fourth pixel portions P1, P2, P3 and P4.

A protection layer 230 is formed on the light-blocking pattern 210 and the color filter layer 220. A transparent conductive layer 240 is formed on the protection layer 230. The transparent conductive layer 240 may be opposite to the pixel electrodes of the array substrate 100. The transparent conductive layer 240 is an opposite electrode of the pixel electrodes. In addition, the transparent conductive layer 240 may be used as a common electrode of a liquid crystal capacitor.

Figure 8:
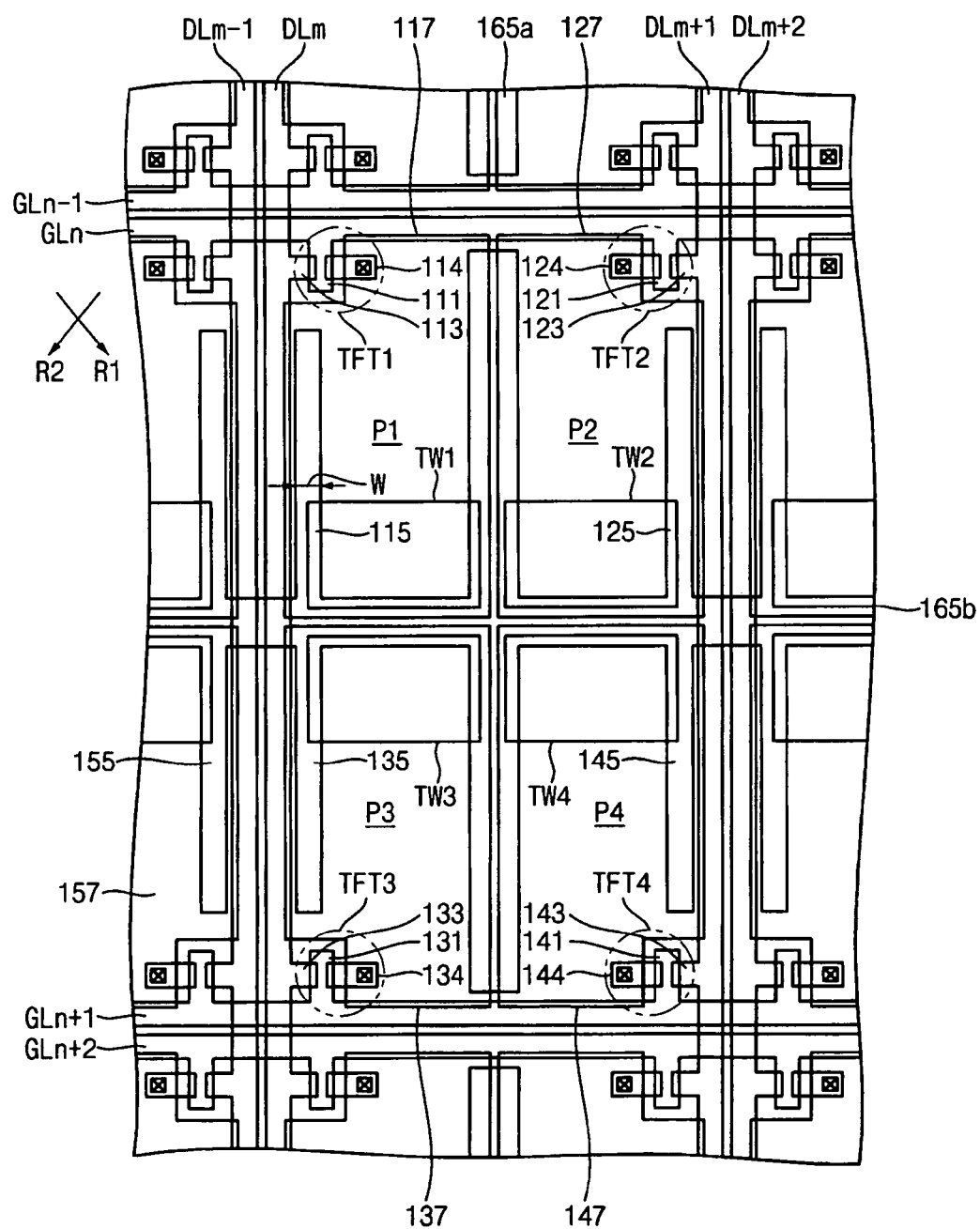
FIG. 8 is a partially enlarged view illustrating an array substrate in accordance with an exemplary embodiment of the present invention.

FIG. 8 is a partial enlarged view illustrating an array substrate in accordance with an exemplary embodiment of the present invention. In FIG. 8, the same reference numerals denote the same elements in FIG. 2, and thus any further explanation of the same elements will be omitted.

Referring to FIG. 8, two data lines that are adjacent to each other, a fist storage line 165a and a second storage line 165b together define first to fourth pixel areas. First, second, third and fourth pixel portions P1, P2, P3 and P4 are formed in the first, second, third and fourth pixel areas, respectively.

In detail, the first pixel portion P1 includes a first switching device TFT1, a first storage capacitor CST1, a first pixel electrode 117 and a first reflection plate. The first switching device TFT1 includes a gate electrode 111, a source electrode 113 and a drain electrode 114. The gate electrode 111 is connected to an n-th gate line GLn. The source electrode 113 is connected to an m-th data line DLm. The drain electrode 114 is connected to the first pixel electrode 117.

The first storage capacitor CST1 includes a first lower electrode and a second lower electrode. The first and second storage lines 165a and 165b and a first storage pattern 115 are used as the first lower electrode. The first pixel electrode 117 is used as the first upper electrode. The first storage pattern 115 is adjacent to the m-th data line DLm. In addition, the first storage pattern 115 is substantially parallel to the m-th data line DLm.

A width of W the first storage pattern 115 is at least a sum of a first width W1 and a second width W2. The first width W1 is determined based on a misalignment between an array substrate and a substrate opposite to the array substrate. The second width W2 is determined based on a light leakage due to a disclination in a liquid crystal layer.

The first reflection plate is formed on the first pixel electrode 117. The first reflection plate includes a first window TW1. An inner light passes through the first window TW1. An outer light may be reflected on the first reflection plate.

Second, third and fourth windows TW2, TW3 and TW4 are formed through the second, third and fourth pixel portions P2, P3 and P4, respectively. The second, third and fourth windows TW2, TW3 and TW4 are substantially identical to the first window TW1. Thus, any further explanation thereof will be omitted.

Here, the first, second, third and fourth windows TW1, TW2, TW3 and TW4 are formed through a central portion of a quadrangle region defined by the first, second, third and fourth pixel areas P1, P2, P3 and P4, respectively.

A first thickness of a first portion of the liquid crystal layer, the first portion being positioned over a body of the reflection plate, is substantially smaller than a second thickness of a second portion of the liquid crystal layer, the second portion being positioned a window of the reflection plate. In detail, the second thickness may be twice as much as the first thickness. Thus, liquid crystal molecules may be irregularly arranged in the second portion so that a light leakage may occur around the second portion. The light leakage may be suppressed by forming the gate metal pattern under the second portion.

In order to efficiently form the gate metal pattern under the second portion, the first, second, third and fourth windows TW1, TW2, TW3 and TW4 are formed through the central portion of the quadrangle region defined by the first, second, third and fourth pixel areas P1, P2, P3 and P4, respectively.

According to the embodiments of the present invention, an array substrate and a color filter substrate may be efficiently formed by using a mask that is independent of a rubbing direction. In addition, a display device may include a light-blocking pattern having a relatively small area.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. An array substrate comprising:
   storage lines dividing a region defined by two gate lines and two data lines into a first pixel area, a second pixel area, a third pixel area and a fourth pixel area, the two gate lines being adjacent and substantially parallel to each other, and the two data lines being adjacent and substantially parallel to each other, wherein the storage lines intersect each other in the region to define the first, second, third and fourth pixel areas;
   a first pixel portion provided in the first pixel area;
   a second pixel portion provided in the second pixel area;
   a third pixel portion provided in the third pixel area; and
   a fourth pixel portion provided in the fourth pixel area.

2. The array substrate of claim 1, wherein each of the first, second, third and fourth pixel portions comprises:
   a switching device including a control electrode, a first current electrode and a second current electrode, the control electrode being connected to a gate line, and the first current electrode being connected to a data line; and
   a pixel electrode connected to the second current electrode of the switching device.

3. The array substrate of claim 2, wherein each of the first, second, third and fourth pixel portions comprises a storage capacitor, the storage capacitor corresponding to a region where the pixel electrode and a storage line overlap.

4. The array substrate of claim 3, wherein the storage line comprises a storage pattern, the storage pattern being adjacent and substantially parallel to the data line connected to the first current electrode of the switching device.

5. The array substrate of claim 1, wherein the first, second, third and fourth pixel portions together define a quadrangular region, and a plurality of switching devices are formed at angular portions of the quadrangular region.

6. The array substrate of claim 1, further comprising a first reflection plate, a second reflection plate, a third reflection plate and a fourth reflection plate respectively formed in the first, second, third and fourth pixel areas.

7. The array substrate of claim 6, wherein each of the first, second, third and fourth reflection plates includes a window therethrough.

8. The array substrate of claim 7, wherein the first, second, third and fourth pixel portions together define a quadrangular region, and the windows are formed through a central portion of the quadrangular region.

9. A display panel comprising:
   an array substrate including storage lines, a first pixel portion, a second pixel portion, a third pixel portion and a fourth pixel portion, wherein:
      the storage lines divide a region into a first pixel area, a second pixel area, a third pixel area and a fourth pixel area, wherein the storage lines intersect each other in the region to define the first, second, third and fourth pixel areas;
      the region is defined by two gate lines and two data lines;
      the two gate lines are adjacent and substantially parallel to each other;
      the two data lines are adjacent and substantially parallel to each other; and
      the first, second, third and fourth pixel portions are formed in the first, second, third and fourth pixel areas, respectively;
   a liquid crystal layer; and
   an opposite substrate combined with the array substrate to receive the liquid crystal layer between the opposite substrate and the array substrate.

10. The display panel of claim 9, wherein the opposite substrate includes a light-blocking pattern corresponding to the data lines and the gate lines.

11. The display panel of claim 9, wherein each of the first, second, third and fourth pixel portions comprises:
   a switching device including a control electrode, a first current electrode and a second current electrode, the control electrode being connected to a gate line, and the first current electrode being connected to a data line; and
   a pixel electrode connected to the second current electrode of the switching device.

12. The display panel of claim 11, wherein the first, second, third and fourth pixel portions together define a quadrangular region, and the switching devices are formed at angular portions of the quadrangular region.

13. The display panel of claim 11, wherein the opposite substrate includes a light-blocking pattern and the light-blocking pattern corresponds to the switching devices.

14. The display panel of claim 11, wherein a storage line comprises a storage pattern, the storage pattern being adjacent and substantially parallel to the data line connected to the first current electrode of the switching device.

15. The display panel of claim 10, wherein:
    the light-blocking pattern includes a portion corresponding to a data line, the portion having a first width and the data line having a second width;
    a storage line has a third width; and
    the first width no more than a sum of the second width and the third width.

16. The display panel of claim 15, wherein the first width is substantially larger than the second width.

17. The display panel of claim 9, further comprising a first reflection plate, a second reflection plate, a third reflection plate and a fourth reflection plate respectively formed in the first, second, third and fourth pixel areas.

18. The display panel of claim 17, wherein each of the first, second, third and fourth reflection plates includes a window therethrough.

19. The display panel of claim 18, wherein the first, second, third and fourth pixel portions together define a quadrangular region, and the windows are formed through a central portion of the quadrangular region.

* * * * *